Nov. 26, 1957  A. HOARE  2,814,389
EDGE FILTER WITH CLEANING MEANS
Filed April 19, 1955

INVENTOR
Arthur Hoare
BY Emory L. Groff
Attorney

United States Patent Office 2,814,389
Patented Nov. 26, 1957

2,814,389
EDGE FILTER WITH CLEANING MEANS

Arthur Hoare, Newport, Isle of Wight

Application April 19, 1955, Serial No. 502,349

9 Claims. (Cl. 210—357)

This invention relates to filters or strainers of the kind comprising a substantially cylindrical straining wall provided with circumferential slots through which the liquid to be strained flows radially, the straining wall having a part cut away so as to break the continuity of the slots in the circumferential direction and provide each slot with an open end, means for preventing the radial flow of liquid through the cut away part, a cleaning knife in continuous engagement with each slot, said cleaning knives being mounted independently of the straining wall, and means for producing relative oscillating movement between the cleaning knives and the straining wall about the axial region of the latter so that the cleaning knives travel along the slots and towards the end of their travel the leading edge of each cleaning knife emerges through the open end of its slot so as to eject foreign matter.

The principal object of the present invention is to improve the cleaning action of the knives particularly with respect to foreign matter adhering to the outer surface of the straining wall.

According to the invention, in a filter or strainer of the kind described, the straining wall and the cleaning knives are so arranged that the relative movement of the cleaning knives is eccentric with respect to the straining wall whereby the knives are caused to emerge radially from the circumferential slots in the straining wall. Such radial movement of the knives enables them to lift foreign matter deposited on the outer surface of the straining wall and carry it to the cut-away part in the straining wall in which it is deposited.

One embodiment of the invention will now be described with reference to the accompanying drawings, in which.

Figure 1:
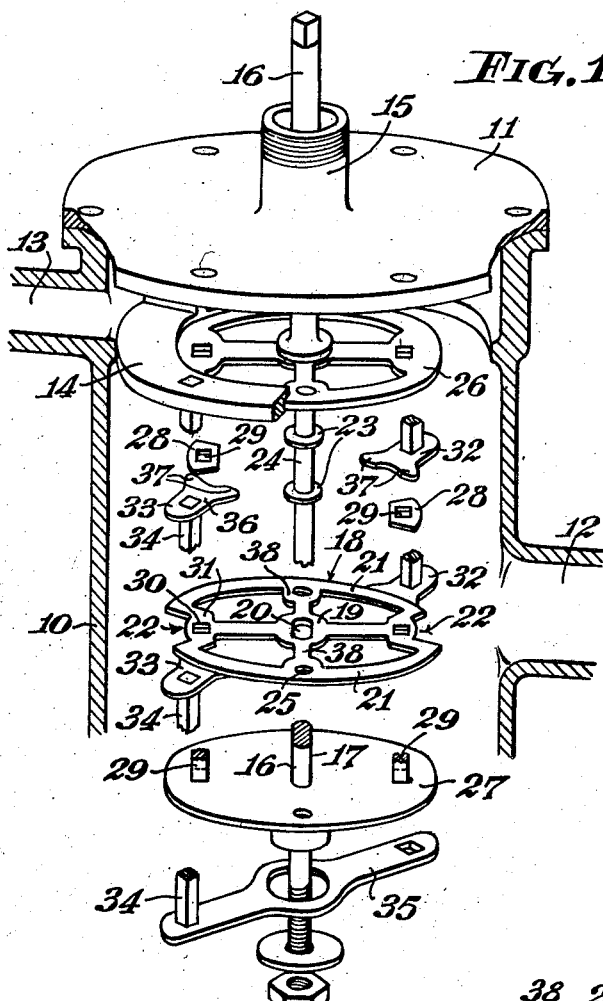
Figure 1 is an exploded perspective view of the device.

The filter comprises a body 10 having a top cover 11, an inlet 12 and an outlet 13. An annular member 14 is formed integrally with the cover 11 and is located level with the bottom edge of the outlet 13. The cover 11 is also formed with a tubular member 15 through which passes a central shaft 16 having flat sides 17. The shaft 16 serves to support annular blades 18 which constitute the filter wall. The blades 18 are of spider form having a hub 19 formed with an aperture 20 for passage of the shaft 16. Each blade 18 comprises two circumferential portions 21 separated from each other by recesses 22, said circumferential portions 21 being struck about centres located on opposite sides of the axis of rotation of the shaft 16, whereby on rotation the movement of the portions 21 is eccentric with respect to said axis. The blades 18 are maintained the desired distance apart by means of washers 23 mounted on circular spindles 24 which pass through apertures 25 in inwardly projecting lugs 38 on the blades 18, the spindles 24 being mounted at their ends in top and bottom clamping plates 26 and 27 respectively, the plates 26 and 27 being secured to the shaft 16. Radial flow of liquid through the recesses 22 is prevented by means of washers 28 located between the blades 18 and mounted on square spindles 29 which pass through apertures 30 in lugs 31 on the blades 18 and are mounted at their ends in the clamping plates 26 and 27.

Figure 2:
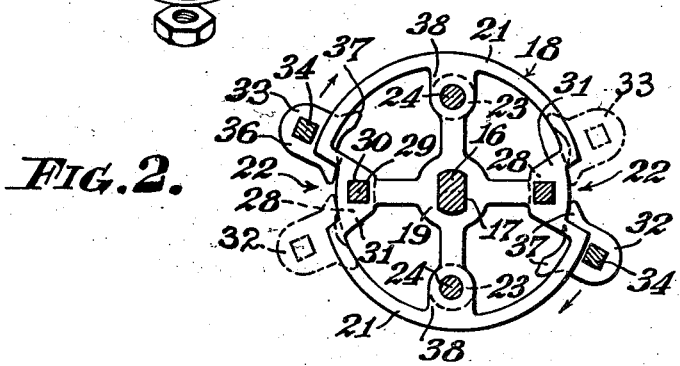
Figure 2 is a diagrammatic plan view.

Two sets of cleaning knives 32 and 33 are fixedly mounted on square rods 34 which are secured at their upper ends into the member 14 and at their lower ends into a bottom supporting bracket 35. The knives 32 and 33 have a bowed inner edge 36 formed with a nose 37 at each end thereof which normally extends into the circumferential slots between the blades 18, as indicated in full lines in Figure 2. As the blade assembly is rotated with respect to the knives by the rotation of shaft 16, the knives 32 and 33 are caused to emerge from the circumferential slots in the manner and with the effect hereinbefore described, the final positions of the blades being as indicated in dotted lines in Figure 2. For the sake of convenience, it has been assumed that the straining wall has remained stationary and the knives rotated in the direction of the arrows. The blade assembly may then be returned to the normal position with the cleaning knives in position in the circumferential slots.

It will be understood that the blades 18 may be formed with a single recess 22 only, in which case the periphery of each blade will be drawn from a centre with a uniformly increasing radius. In this case, of course, only a single set of cleaning knives is provided.

I claim:

1. A liquid filter comprising a substantially cylindrical straining wall formed with circumferential slots through which the liquid to be strained flows radially, the straining wall having a part cut away so as to break the continuity of the slots in the circumferential direction and provide each slot with an open end, means for preventing radial flow of liquid through the cut away part, cleaning knives continuously extending into said slots, said cleaning knives being mounted independently of the straining wall, and means for producing relative oscillating movement between the cleaning knives and the straining wall about the axial region of said wall, the movement of the knives being eccentric with respect to the straining wall, whereby the cleaning knives travel along the slots while progressively emerging radially therefrom until towards the end of their travel the leading edges of the knives emerge through the open ends of the slots.

2. A liquid filter comprising a substantially cylindrical straining wall consisting of a central shaft, a plurality of annular blades of spider form mounted on said central shaft, each of said blades comprising two circumferential portions separated from each other by recesses at each end thereof, said circumferential portions being struck about centres located on opposite sides of the axis of rotation of said central shaft whereby on rotation the movement of said circumferential portions is eccentric with respect to said axis, means for spacing said annular blades a predetermined distance apart so as to form circumferential slots therebetween, and means for preventing radial flow of liquid through said recesses, and two sets of cleaning knives fixedly mounted with respect to the axis of the straining wall, the edges of said knives normally extending into said circumferential slots, whereby on rotation of the straining wall, said knives travel along said slots while progressively emerging radially therefrom until towards the end of their travel the leading edges of the knives emerge through the open ends of the slots.

3. A liquid filter comprising a substantially cylindrical straining wall consisting of a central shaft, a plurality of annular blades of spider form mounted on said central shaft, each of said blades having a periphery drawn from a centre with a uniformly increasing radius and being formed with a circumferential recess, means for spacing said annular blades a predetermined distance apart so as to form circumferential slots therebetween, and means for preventing radial flow of liquid through said recesses, and a set of cleaning knives fixedly mounted with respect to the axis of the straining wall, the edges of said knives normally extending into said circumferential slots, whereby on rotation of the straining wall, said knives travel along said slots while progressively emerging radially therefrom until towards the end of their travel the leading edges of the knives emerge through the open ends of the slots.

4. A liquid filter according to claim 2, wherein said means for spacing said annular blades consists of washers mounted on spindles which pass through inwardly projecting lugs on said blades.

5. A liquid filter according to claim 3, wherein said means for spacing said annular blades consists of washers mounted on spindles which pass through inwardly projecting lugs on said blades.

6. A liquid filter according to claim 2, wherein said means for preventing the radial flow of liquid consists of washers located in said recesses and mounted on spindles passing through the assembly.

7. A liquid filter according to claim 3, wherein said means for preventing the radial flow of liquid consists of washers located in said recesses and mounted on spindles passing through the assembly.

8. A liquid filter according to claim 2, wherein the portion of the cleaning knife which enters the circumferential slot is of bowed form and is provided with a nose or tip at each end thereof.

9. A liquid filter according to claim 3, wherein the portion of the cleaning knife which enters the circumferential slot is of bowed form and is provided with a nose or tip at each end thereof.

References Cited in the file of this patent

UNITED STATES PATENTS

| | | |
|---|---|---|
| 1,849,582 | Lundborg | Mar. 15, 1932 |
| 1,999,149 | Durdin | Apr. 23, 1935 |

FOREIGN PATENTS

| | | |
|---|---|---|
| 615,042 | Great Britain | Dec. 31, 1948 |